Oct. 16, 1928.
G. T. RANDOL
1,687,590
GEAR SHIFTING MECHANISM
Filed July 17, 1924   5 Sheets-Sheet 1
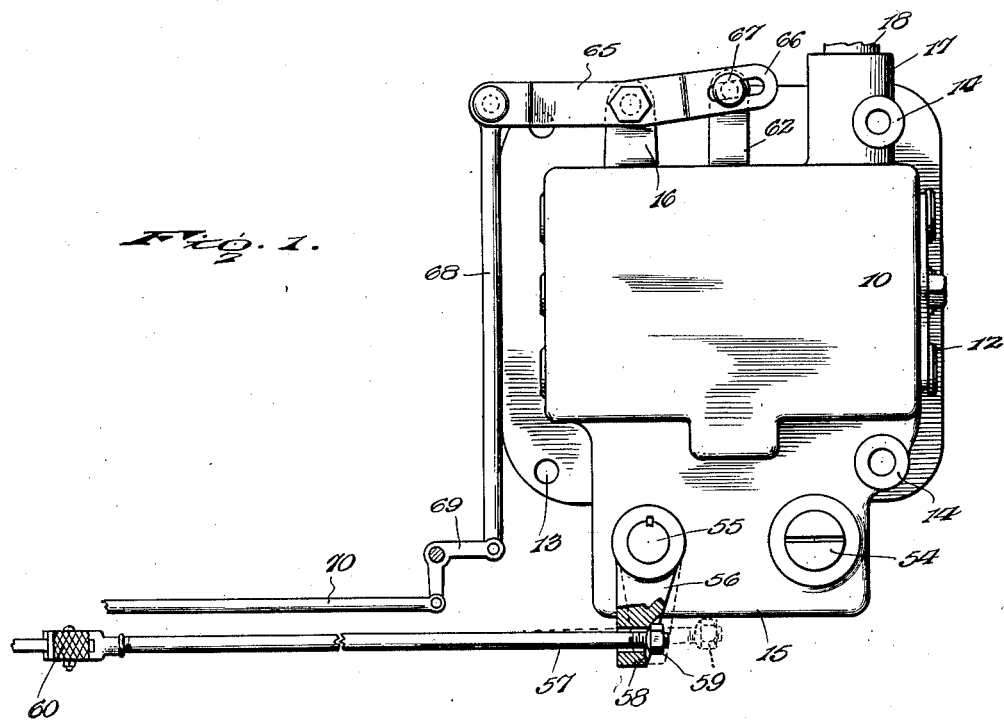
Fig. 1.
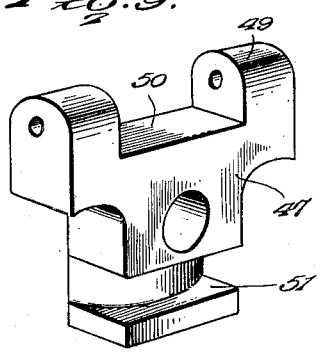
Fig. 9.
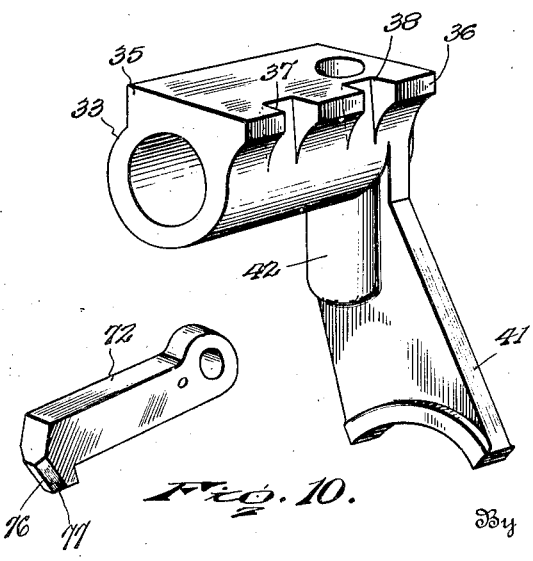
Fig. 8.
Fig. 10.
Inventor
G. T. Randol.
By
Lacy & Lacy, Attorneys

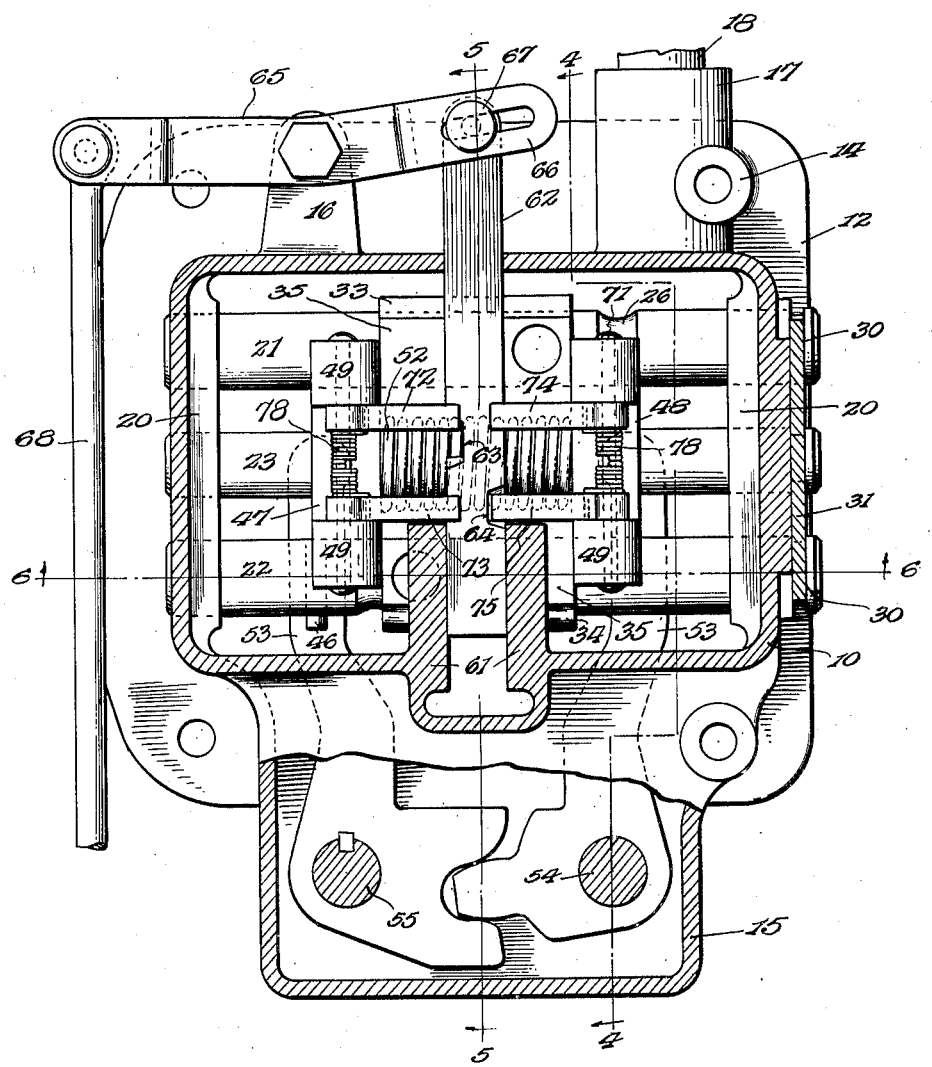

Oct. 16, 1928.
G. T. RANDOL
1,687,590
GEAR SHIFTING MECHANISM
Filed July 17, 1924  5 Sheets-Sheet 3
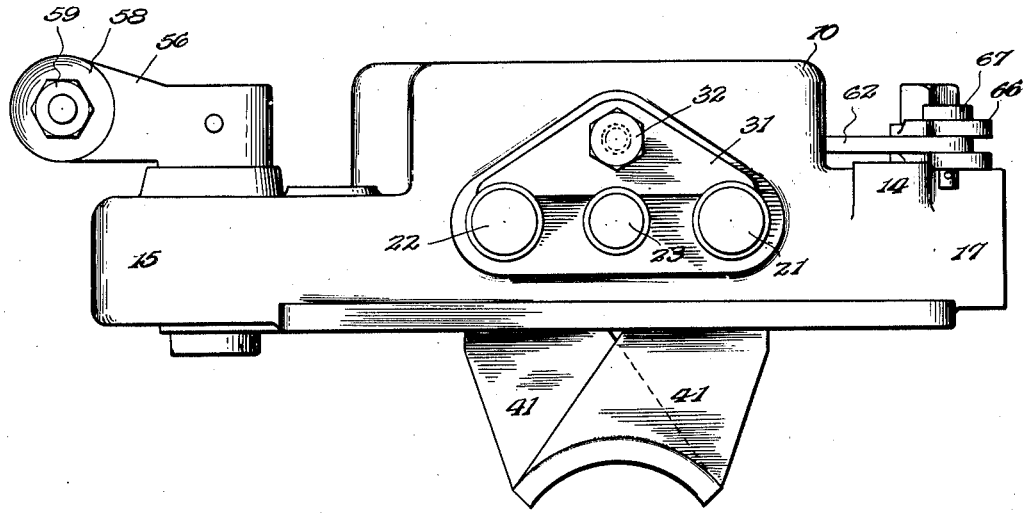
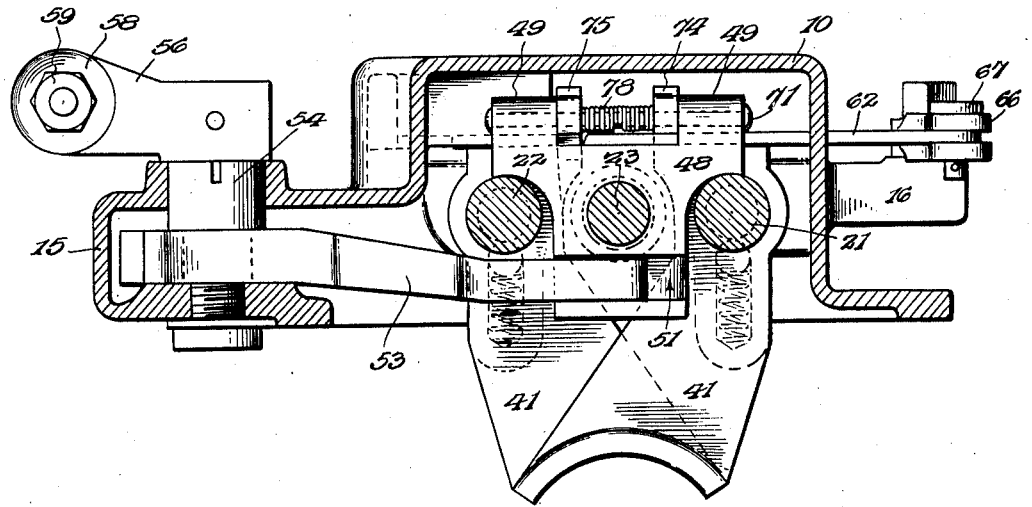
Inventor
G. T. Randol.
By Lacey Lacey, Attorney

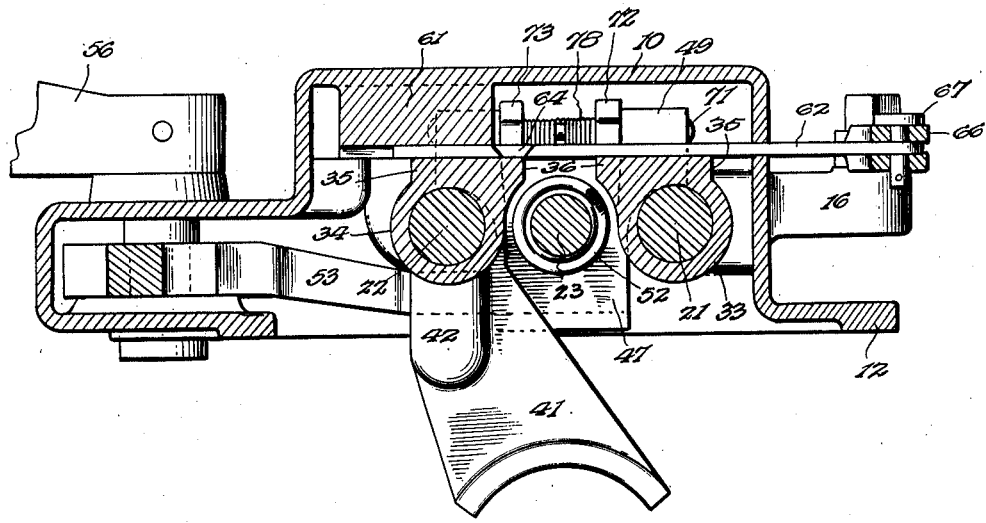
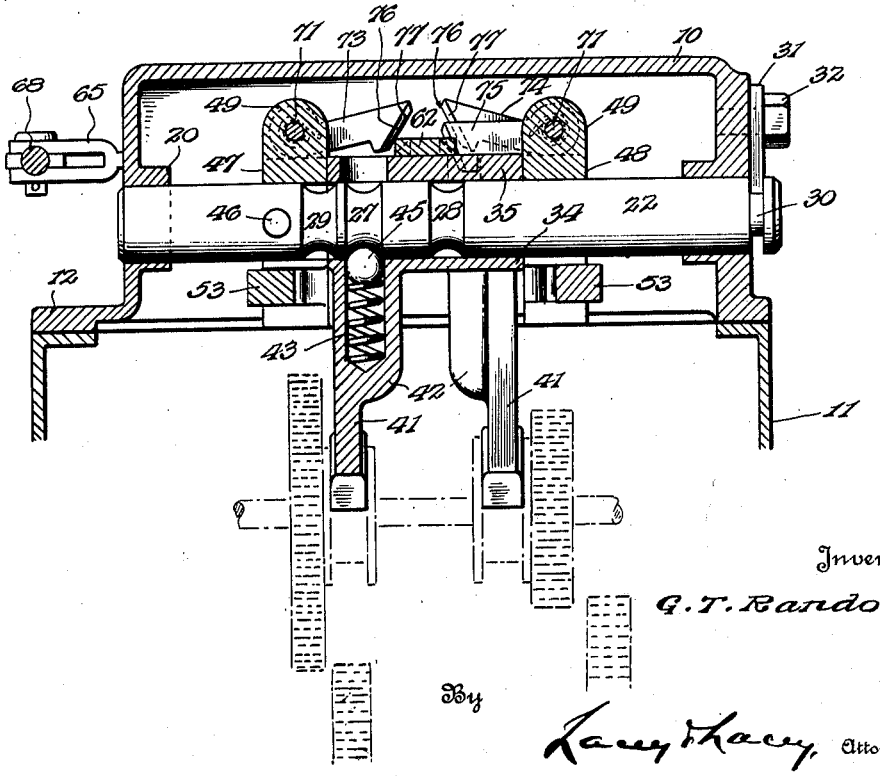

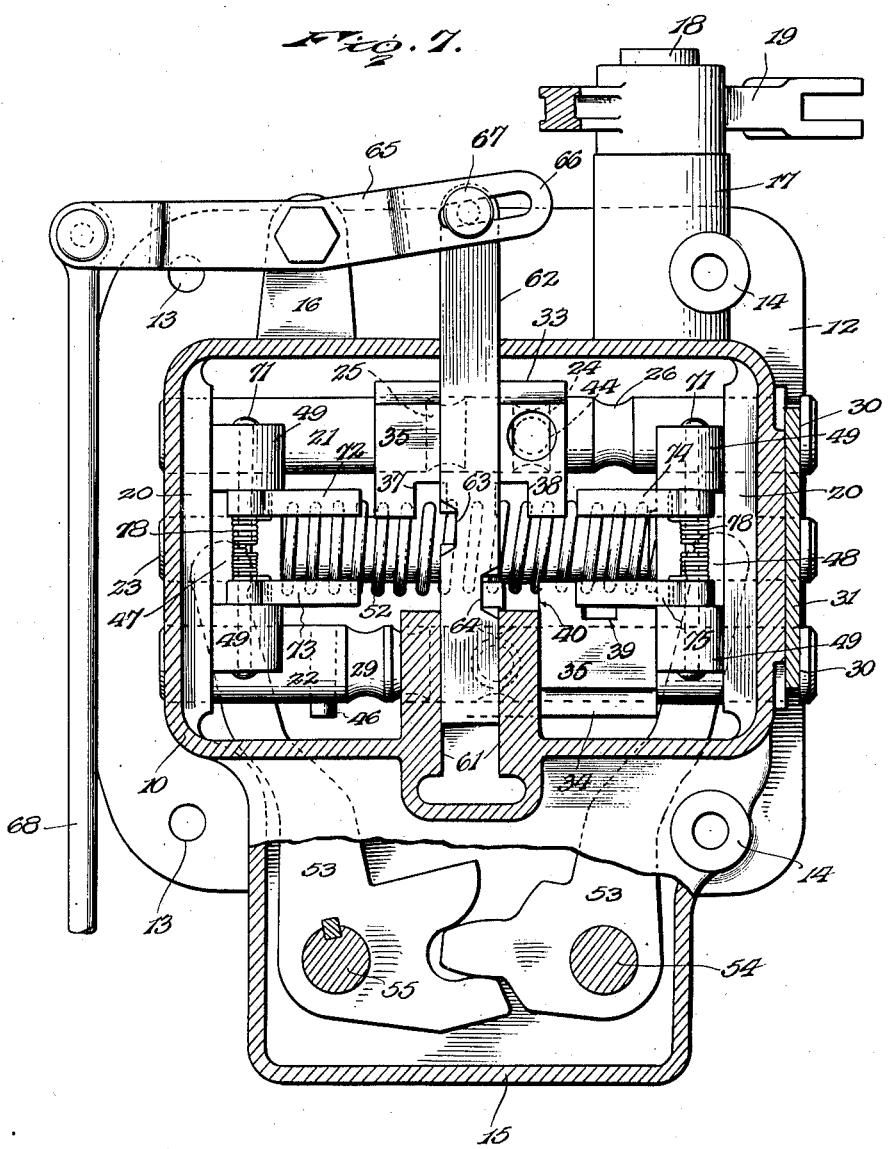

Patented Oct. 16, 1928.

1,687,590

UNITED STATES PATENT OFFICE.

GLENN T. RANDOL, OF MUNCIE, INDIANA.

GEAR-SHIFTING MECHANISM.

Application filed July 17, 1924. Serial No. 726,565.

This invention relates to an improved gear shifting mechanism for motor vehicles and seeks to provide a mechanism of this character wherein the different speeds may be selected at will.

The invention further seeks to provide a mechanism embodying a power spring for performing the work of shifting the gears and wherein said spring will be mounted in the most advantageous position so as to expand in the direction of travel of the parts shifted thereby directly against said parts.

And the invention still further seeks to provide a mechanism which can be readily attached to motor vehicle transmission housing as now in use, which, when so applied, will not interfere with the floor boards of the vehicle, and which will be simple, compact and easy to manufacture, whereby the mechanism may be successfully produced and sold in competition with the present forms of hand shifting devices.

Other and incidental objects will appear hereinafter.
In the accompanying drawings:

Figure 1 is a plan view of my improved mechanism, showing the clutch pedal illustrated, moved to the limit of its forward throw and the mechanism neutralized, Figure 2 is a horizontal sectional view, the gear shifters being shown in neutral position, Figure 3 is an end elevation of the mechanism, Figure 4 is a transverse sectional view on the line 4—4 of Figure 2, looking in the direction indicated by the arrows, Figure 5 is a transverse sectional view on the line 5—5 of Figure 2, looking in the direction indicated by the arrows, this view particularly showing the mounting of the selector bar employed, Figure 6 is a sectional view on the line 6—6 of Figure 2, looking in the direction indicated by the arrows, and particularly showing the mounting of the shifters, Figure 7 is a horizontal sectional view similar to Figure 2, this view showing the position of the parts when the second speed gear is shifted, Figure 8 is a detail perspective view of one of the shifters, Figure 9 is a detail perspective view of one of the latch carrying yokes employed, and Figure 10 is a detail perspective view of one of the latches.

In carrying the invention into effect, I employ an oblong casing 10 which, as suggested in Figure 6 of the drawings, is formed to fit over the opening at the top of a conventional transmission housing, as indicated at 11, and is provided with a base flange 12 to mate with said housing. At the forward end of the casing the flange 12 is provided with openings 13 while at the rear end of the casing are sleeves 14 adapted to receive suitable cap bolts securing the casing to the housing. At one side the casing is formed with a reduced extension 15 while at the opposite side of the casing is an arm 16 as well as a sleeve 17. As particularly shown in Figure 7, the sleeve 17 is formed to accommodate a shaft 18 on which may be mounted any approved emergency brake lever, as indicated at 19.

As brought out in Figure 2, the end walls of the casing 10 are thickened to form transversely disposed stops 20 lying at the inner sides of said end walls and extending through said stops are parallel rods indicated for convenience at 21, 22 and 23 respectively. Formed in the rod 21 at spaced points are, as best shown in Figure 7, annular concave locating grooves 24, 25 and 26 while, as best brought out in Figure 6, the rod 22 is provided with similar spaced locating grooves 27, 28 and 29, it being noted, in this connection, that the grooves 24 and 25 shown in dotted lines in Figure 7, are identical with the groove 26. Near their rear ends, the rods 21, 22 and 23 are provided with annular channels 30 and fitting in said channels is a retaining plate 31 fastened to the adjacent end well of the casing, as best shown in Figure 3, by a cap bolt 32 for securing all of the rods in position. As shall presently be described, the shifters employed are provided with spring pressed detents to engage in the annular grooves of the rods 21 and 22 and by reason of the movement of the detents into and out of the grooves wear upon the walls of the grooves will occur. However, as will be seen, by releasing the plate 31, the rods 21 and 22 may be rotated slightly to present fresh surfaces at the grooves to coact with the detents. Furthermore, by employing the plate 31 only a single fastening device is required for holding all of the rods in position.

Slidable upon the rods 21 and 22 are shifters, indicated for convenience at 33 and 34, one of which is shown in detail in Figure 8 of the drawings. As will be observed, these shifters are formed with sleeves to slidably surround the rods and rising from said sleeves are squared oblong heads 35 having flat upper faces and provided at their inner longitudinal edges with overhanging flanges 36. The flange of the shifter 33 is formed with spaced notches 37 and 38 while the flange of the shifter 34 is, as best seen in Figure 7, provided with similar spaced notches 39 and 40. Depending from the sleeves of the shifters at opposite ends thereof are shifter arms 41 which extend into the housing 11 to engage the sliding gears of the transmission and, in this connection, it may be well to observe that the present mechanism may be employed in conjunction with any conventional selective speed transmission of the sliding gear type. Accordingly, since the transmission mechanism forms no part of the present invention, it need not be described. Formed on the arms 41 at their inner sides are bosses 42 bored to provide sockets for springs 43 and freely fitting in said sockets are ball detents, the detent of the shifter 33 being indicated in dotted lines in Figure 7, at 44, and the detent of the shifter 34 being shown in full lines in Figure 6, at 45. These detents are, of course, identical and mounted in like manner for actuation by the springs 43 to selectively engage in the annular grooves of the rods 21 and 22. In the neutral medial position of the shifters 33 and 34, as shown in Figure 4, the detent 44 of the shifter 33 rests in the groove 24 of the rod 21 while the detent 45 of the shifter 34 rests in the groove 27 of the rod 22 for holding the shifters against movement. To render the low speed gear of the transmission active, the shifter 33 is moved forwardly, when its detent 44 will ride out of the groove 24 of the rod 21 into the groove 25, when the detent will serve to maintain the shifter stationary and hold the gear active. Upon rearward movement of the shifter 33, the reverse gear of the transmission will be rendered active, when the detent 44 will rest in the groove 26 for holding the reverse gear active. To render the second speed gear of the transmission active, the shifter 34 is, as shown in Figure 7, moved rearwardly when the detent 45 of said shifter will ride out of the groove 27 of the rod 22 into the groove 28 for maintaining the shifter stationary and holding the gear active. Upon forward movement of the shifter 34, the high speed gear of the transmission will be rendered active, when the detent 45 will engage in the groove 29 of the rod 22 for holding the gear active and it is now to be observed that the throw of the shifter 34 from neutral position for rendering the high speed gear active is shorter than the throw of said shifter in the opposite direction as well as the forward and rear throw of the shifter 33. Accordingly, I provide the rod 22, as clearly shown in Figure 7, with a stop pin 46 projecting at the outer side of the rod for limiting the shifter 34 in its forward movement.

Slidable on the rod 23 are yokes 47 and 48, one of which is shown in detail in Figure 9 of the drawings. These yokes are identical and are apertured centrally to slidably fit the rod while at their upper ends the yokes are provided with upstanding lugs 49 overhanging the rods 21 and 22 to engage the ends of the heads 35 of the shifter sleeves when the yokes are moved toward each other along said rod. Between the lugs, the yokes are provided with flat faces 50, and formed in the lower ends of said yokes, at their outer sides, are slots 51 having convex bottom walls. Freely surrounding the rod 23 to act against the yokes is a power spring 52 fitting at its ends over suitable centering bosses at the inner sides of the yokes. Thus, the spring 52 will force the yokes apart limited by the stops 20 at the ends of the casings. Mounted in the extension 15 of the casing to project beneath said stops at the outer sides of the yokes 47 and 48 is a pair of arms 53 articulated at their inner ends to swing in unison while at their free ends, said arms are freely received in the slots 51 of the yokes to bear against the convex bottom walls of said slots. One of the arms 53 is, as shown in Figure 4, pivoted upon a cap screw 54 countersunk in the extension 15 while the other of said arms is fixed to a shaft 55 journaled through the casing and upstanding therefrom to receive a lever 56 secured to the shaft. Extending freely through an opening in the free end of said lever is a rod 57 and at the rear end of said opening the lever is provided with a spherical seat 58 to accommodate a nut 59 screwed on the rod, the nut being provided with a spherical face to fit said seat so that the characteristics of a ball and socket joint are thus obtained in the connection between the rod and lever. The rod 57 extends forwardly and is suitably connected with the clutch pedal, as conventionally illustrated at 60, of the vehicle to which the mechanism is applied. Thus, as will be seen, when the clutch pedal is rocked forwardly to disengage the clutch of the vehicle, the free ends of the arms 53 will, as shown in Figure 2, be swung toward each other for shifting the yokes 47 and 48 toward each other along the rod 23 and compressing the spring 52. Furthermore, attention is directed to the fact that if either of the shifters 33 or 34 occupy a forward position, when the yokes are thus shifted toward each other, the forwardly disposed shifter will be returned to neutral position by the yoke 47 while, if either of the shifters occupies a rearward position, the rearwardly disposed shifter will be returned to neutral position by the yoke 48. Accordingly, any previously selected gear will be returned to neutral prior to the shifting of a subsequently selected gear.

Extending transversely of the casing from one side wall thereof are spaced parallel guide flanges 61 depending from the top wall of the casing and slidable through the opposite side wall of the casing between said flanges is a selector bar 62 resting upon the flat upper faces of the heads 35 of the shifters 33 and 34. Formed in the opposite longitudinal edges of the bar are staggered notches 63 and 64 and, as clearly seen in Figures 2 and 7, these notches are provided with beveled side edges. Pivoted upon the arm 16 is a lever 65 provided at one end with a yoke 66 straddling the outer end of the bar 62 and formed in the yoke are suitable slots to accommodate a pin 67 pivotally connecting the lever with the bar. Pivotally connected to the opposite end of the lever is a rod 68 connected, as shown in Figure 1, to a bell crank 69 and extending from the bell crank is a rod 70 which may be connected with a suitable control lever upon the steering wheel of the vehicle so that the lever may be manually operated for shifting the bar 62 longitudinally and selecting the speed gears. Extending through the lugs 49 of the yokes 47 and 48 are rods 71 and pivoted upon the rod of the yoke 47 is a pair of latches 72 and 73 while upon the rod of the yoke 48 is mounted a similar pair of latches 74 and 75. One of these latches is shown in detail in Figure 10 of the drawings and, as will be observed, the latches are formed with downwardly and inwardly inclined end edges 76 as well as with oppositely beveled side faces 77. Surrounding the rods are springs 78 which are secured centrally to the rods while the ends of the springs are engaged with the latches so that the springs will thus function to urge the latches downwardly, limited by the flat upper faces 50 of the yokes. The notches 63 and 64 of the selector bar 62 are of a width to freely receive the ends of the latches therethrough. As best seen in Figure 4, the lugs 49 of the yokes 47 and 48 are formed with curved lower faces to bear against the rods 21 and 22 limiting the yokes against rotation on the rod 23 so that the several latches carried by the yokes will, in turn, be maintained in correct relation to the notches 37, 38, 39 and 40 in the heads of the shifters.

Assuming a gear to have been shifted, as for instance, the second speed gear, as shown in Figure 7, it will now be seen in view of the foregoing, that when the clutch pedal 60 is rocked forwardly, the shifter 34 will be returned to neutral position by the yoke 48 for returning the gear to neutral. Selection of the speed gears is accomplished by positioning the bar 62 longitudinally. As shown in Figure 2, when the yokes 47 and 48 are shifted toward each other by the movement of the clutch pedal, the beveled edges 76 of the latches 72, 73, 74 and 75 will ride over the ends of the flange 36 of either shifter in neutral position and over the side edges of the bar so that the free ends of the latches will be elevated to rest upon the bar. However, assuming that the bar has been set to select the second speed gear, as shown in Figure 2, it will be seen that the notch 64 in the bar is positioned to receive the free end of the latch 75, so that this latch will be permitted to drop down through said notch and engage in the notch 39 of the shifter 34, coupling said shifter with the yoke 48. The remaining latches will, however, be held inactive by the bar so that when the clutch pedal is released, the spring 52 will expand against the yokes 47 and 48 for moving the yoke 48 outwardly along the rod 23 and accordingly carrying the shifter 34 therewith, as shown in Figure 7, for shifting the second speed gear. When either of the shifters is thus moved with one of the yokes, the other of the said shifters will, of course, be held in neutral position by its spring pressed detent while the latches held inactive upon the bar will, when the yokes are moved apart, be carried away from the stationary shifter before any one of said latches can engage in one of the notches of said shifter. Accordingly, only a single shifter will be moved for any given gear selection. To select the low speed gear, the bar 62 is set to position the notch 63 to receive the free end of the latch 72 so that when the clutch pedal is rocked forwardly, said latch will drop into the notch 37 of the shifter 33 for coupling said shifter with the yoke 47. Accordingly, when the clutch pedal is released, the spring 52 will expand for shifting the yoke and carrying the shifter forwardly for shifting the low speed gear. Similarly, to select the reverse gear, the bar 62 is set to position the notch 64 to receive the free end of the latch 74 so that when the yokes are moved toward each other by the clutch pedal, the said latch will drop into the notch 38 of the shifter 33 for carrying the shifter rearwardly, when the clutch pedal is released, and shifting the reverse gear. Similarly, to select the high speed gear, the bar 62 is set to position the notch 63 to receive the free end of the latch 73. Accordingly, when the yokes 47 and 48 are moved toward each other by the clutch pedal, said latch will drop into the notch 40 of the shifter 34 so that when the clutch pedal is released, the shifter 34 will be carried forward for shifting the high speed gear. When said shifter is thus carried forward the yokes 47 and 48 will, as will be seen, not strike the stops 20 since the throw of the yokes will be limited by the engagement of the shifter 34 with the stop pin 46.

I accordingly provide a mechanism wherein the gears are shifted to neutral by means of the clutch pedal while the gears are shifted to active position and held in such position by means of the power spring 52. Should the clutch pedal be moved forwardly so that the yokes 47 and 48 would, as shown in Figure 2, be held at the limit of their inward throw at the time a selection is made, and should one of the latches be received through one of the notches in the selector bar 62, as typically illustrated in this figure of the drawings, it will be seen that when the bar is moved longitudinally to select a future gear to be shifted, the beveled side edges of the notch receiving the free end of the latch will coact with the beveled side faces 77 of such latch for riding the free end of the latch upwardly out of the notch onto the bar. Accordingly, longitudinal movement of the bar will serve to lift any active latch to inactive position resting on the bar so that the selection of the several gears may be freely made regardless of the fact of whether or not a gear has already been selected. The notches 63 and 64 in the bar 62 are so spaced that it is impossible to position the bar so that both notches will simultaneously register with any two of the latches. Accordingly, only a single gear can be selected at any one setting of the bar. To set the mechanism in neutral, the bar 62 is positioned so that neither of the notches 63 and 64 therein is disposed to register with the free end of any one of the latches.

In Figure 1 of the drawings, the clutch pedal 60 is shown at the limit of its forward movement and, accordingly, the lever 56 is swung forwardly for neutralizing the transmission gears. Forward movement of the clutch pedal is, of course, limited by the movement of the yokes 47 and 48 to neutral position. Normally, the lever 56 will, through the action of the power spring 52, be held in the dotted line position shown in this figure, backward travel of the lever being limited by the engagement of the free ends of the arms 53 with the end walls of the casing 10. Also, the rod 57 will, through the action of the clutch spring, be normally held in the dotted line position illustrated. Thus, the nut 59 will, under ordinary circumstances, when the clutch is engaged, stand away from the lever. The clearance between the nut and the lever is such that the clutch pedal may be rocked forwardly approximately two-thirds of its throw for fully releasing the clutch without affecting any change in or operation of the gear shifting mechanism while, when the clutch pedal is rocked further forward, the nut 59 will engage and swing the lever 56 forwardly for actuating the mechanism incident to the last third of the throw of the pedal. Upon the release of the pedal, the power spring 52 will, therefore, during the initial third of the return throw of the lever, function to shift any gear selected before the clutch is engaged so that when the lever completes its return throw and the clutch becomes engaged, the vehicle will be driven at the selected speed.

Having thus described the invention, what I claim is:

1. A gear shifting mechanism including gear shifters, opposed elements spring pressed apart, coacting levers to engage the lower end portions of said elements for shifting said elements toward each other and returning said shifters to neutral position, means carried by the upper end portions of said elements for selectively coupling said shifters with said elements to travel therewith when moved away from each other, and selecting means to coact with said coupling means.

2. A gear shifting mechanism including gear shifters, opposed elements spring pressed apart and provided near their lower ends with slots having convex bottom walls, coacting levers received at their free ends in said slots to engage said bottom walls for shifting said elements toward each other and returning said shifters to neutral position, means carried by the upper ends of said elements for selectively coupling said shifters with said elements to travel therewith when moved away from each other, and selecting means to coact with said coupling means.

3. A gear shifting mechanism including gear shifters, opposed yokes spring pressed apart, articulated levers pivoted near corresponding ends thereof to coact at their free ends with said yokes for shifting the yokes toward each other and returning said shifters to neutral position, means carried by the yokes for selectively coupling said shifters to said yokes to travel therewith when moved away from each other, and selecting means to coact with said coupling means.

4. A gear shifting mechanism including gear shifters, opposed elements spring pressed apart, means for shifting said elements toward each other and returning said shifters to neutral position, means pivoted upon said elements for selectively coupling said shifters with said elements to travel therewith when moved away from each other, and selecting means disposed to limit said coupling means in inactive position and movable to permit said coupling means to selectively engage said shifters, the selecting means being provided with means to coact with said coupling means whereby the selecting means may be moved for shifting the coupling means to inactive position.

5. A gear shifting mechanism including gear shifters, opposed elements, yieldable means pressing said elements apart and common thereto, means for shifting said elements toward each other and returning said shifters to neutral position, latches pivoted upon said elements for selectively coupling said shifters with said elements to travel therewith when moved away from each other, and a selector bar disposed to lie beneath the free ends of said latches for limiting the latches in inactive position and movable to permit the latches to selectively swing into engagement with said shifters.

6. A gear shifting mechanism including gear shifters, opposed elements, yieldable means pressing said elements apart and common thereto, means for shifting said elements toward each other and returning said shifters to neutral position, latches pivoted upon said elements for selectively coupling said shifters with said elements to travel therewith when moved away from each other, and a selector bar slidable beneath the free ends of said latches and provided with notches to freely receive the free ends of the latches therethrough whereby the bar may be positioned to selectively permit the latches to swing into engagement with said shifters.

7. A gear shifting mechanism including gear shifters formed with heads having overhanging flanges provided with notches, opposed elements spring pressed apart, means for shifting said elements toward each other and engageable with the heads of said shifters for returning the shifters to neutral position, latches pivoted upon said elements for selectively coupling said shifters with said elements to travel therewith when moved away from each other, and a slidable selector bar disposed to lie beneath the free ends of said latches and having notches to receive the free ends of the latches therethrough whereby the bar may be set to selectively permit the latches to swing through the notches of the bar for engagement in the notches of the heads of the shifters.

8. A gear shifting mechanism including gear shifters formed with heads having overhanging flanges provided with notches, opposed elements spring pressed apart, means for shifting said elements toward each other and engageable with the heads of said shifters for returning the shifters to neutral position, latches pivoted upon said elements for selectively coupling said shifters with said elements to travel therewith when moved away from each other, and a slidable selector bar disposed to lie beneath the free ends of said latches and having notches to receive the free ends of the latches therethrough whereby the bar may be set to selectively permit the latches to swing through the notches of the bar for engagement in the notches of the heads of the shifters, the latches being provided at their free ends with beveled edges to coact with the side edges of the bar for riding the free ends of the latches upwardly on the bar when the latches are moved endwise relative to the bar and the notches of the bar as well as the free ends of the latches being provided with coacting beveled faces for riding the free ends of the latches upwardly into inactive position when the bar is shifted.

9. A gear shifting mechanism including a casing, rods mounted thereon, gear shifters slidable on certain of said rods, opposed elements slidable on another of said rods and spring pressed apart, means for shifting said elements toward each other to coact with said shifters for returning the shifters to neutral position, means for selectively coupling said shifters with said elements to travel therewith when moved away from each other, selecting means to coact with said coupling means, and means locking the rods against endwise movement.

10. A gear shifting mechanism including a casing, rods mounted thereon, gear shifters slidable on certain of said rods, opposed elements slidable on another of said rods and spring pressed apart, means for shifting said elements toward each other to coact with said shifters for returning the shifters to neutral position, means for selectively coupling said shifters with said elements to travel therewith when moved away from each other, selecting means to coact with said coupling means, the rods carrying said shifters being provided with annular grooves, spring pressed detents carried by the shifters to selectively engage in said grooves for holding the shifters against free movement, and means locking the rods against endwise movement.

11. A gear shifting mechanism including a casing, rods mounted thereon, gear shifters slidable on certain of said rods, opposed elements slidable on another of said rods and spring pressed apart, means for shifting said elements toward each other to coact with said shifters for returning the shifters to neutral position, means for selectively coupling said shifters with said elements to travel therewith when moved away from each other, selecting means to coact with said coupling means, the rods carrying said shifters being provided with annular grooves, spring pressed detents carried by the shifters to selectively engage in said grooves for holding the shifters against free movement, the rods carrying the shifters being rotatable to present fresh surfaces at the grooves to said detents, and means normally locking the rods against reciprocation.

12. A gear shifting mechanism including a casing, rods mounted thereon, gear shifters slidable on certain of said rods, opposed elements slidable on another of said rods and spring pressed apart, means for shifting said elements toward each other to coact with said shifters for returning the shifters to neutral position, means for selectively coupling said shifters with said elements to travel therewith when moved away from each other, selecting means to coact with said coupling means, the rods carrying said shifters being provided with annular grooves, spring pressed detents carried by the shifters to selectively engage in said grooves for holding the shifters against free movement, all of said rods being provided near corresponding ends thereof with channels and the rods mounting said shifters being rotatable to present fresh surfaces at said grooves to the detents, and a plate secured to the casing and engaging in said channels for holding all of the rods against endwise movement.

13. A gear shifting mechanism including a casing, rods thereon, gear shifters slidable on certain of said rods, opposed elements slidable upon another of said rods and spring pressed apart, said elements being provided with means to engage the ends of said shifters, means for shifting said elements toward each other and returning said shifters to neutral position, means for selectively coupling said shifters with said elements to travel therewith when moved away from each other, selecting means to coact with said coupling means, and means locking the rods against endwise movement.

14. A gear shifting mechanism including a casing, rods mounted thereon, gear shifters slidable on certain of said rods, opposed yokes slidable on another of said rods and provided with lugs engageable with the ends of the shifters, means for shifting said yokes toward each other and returning said shifters to neutral position, pivoted latches carried by the lugs of said yokes for selectively coupling said shifters with said yokes to travel therewith when moved away from each other, a selector bar to coact with said latches, and means locking the rods against endwise movement.

15. A gear shifting mechanism including a casing, rods mounted thereon, gear shifters slidable on certain of said rods, opposed yokes slidable on another of said rods and provided at their upper ends with lugs engageable with the ends of the shifters, a spring bearing between said yokes pressing the yokes apart, coacting levers cooperating with the lower end portions of the yokes and operable for shifting the yokes toward each other and returning the shifters to neutral position, pairs of pivoted latches carried by the lugs of the yokes for selectively coupling said shifters with said yokes to travel therewith when moved away from each other, and a slidable selector bar to coact with the free ends of said latches.

16. In gear shifting mechanism, gear shifting means, means spring pressed apart for shifting said shifting means, means for selectively coupling said second mentioned means with the gear shifting means, and pivoted levers straddling said second mentioned means and simultaneously movable for shifting said second mentioned means toward each other and returning said shifting means to neutral position.

17. In gear shifting mechanism, gear shifting means, means spring pressed apart for shifting said shifting means, means for selectively coupling said second mentioned means with the gear shifting means, and levers pivoted to coact at their free ends with said second mentioned means and articulated to swing in unison for shifting said second mentioned means toward each other and returning said shifting means to neutral position.

18. In gear shifting mechanism, gear shifters, opposed spring pressed elements movable apart for shifting said shifters, means for selectively coupling said shifters with said elements to travel therewith when moving apart, and pivoted levers diverging to coact at their inner ends with said elements and articulated near their outer ends to swing in unison for shifting said elements toward each other and returning the shifters to neutral position.

19. In gear shifting mechanism, gear shifting means, means spring pressed apart for shifting said shifting means, coupling means for selectively coupling said shifting means with said second mentioned means to travel therewith when moving apart, and selecting means to coact with said coupling means and slidably movable for shifting said coupling means from active position to inactive position.

20. In gear shifting mechanism, gear shifters, opposed elements spring pressed apart for shifting said shifters, latches for selectively coupling said shifters with said elements to travel therewith when moving apart, and a selector bar to coact with said latches and movable to shift any one of said latches from active position to inactive position.

21. In gear shifting mechanism, gear shifters, rods movably supporting said shifters, another rod located between said first mentioned rods, opposed elements movable on the latter rod and formed to overhang said first mentioned rods to coact therewith for limiting said elements against rocking movement, means pressing said elements apart, and means for selectively coupling said shifters with said elements to travel therewith when moving apart.

In testimony whereof I affix my signature.

GLENN T. RANDOL. [L. S.]